United States Patent
Morgan et al.

(10) Patent No.: US 8,375,862 B2
(45) Date of Patent: Feb. 19, 2013

(54) GAS GENERATING SYSTEM

(75) Inventors: Richard W. Morgan, Washington, MI (US); Eduardo L. Quioc, Westland, MI (US)

(73) Assignee: TK Holdings, Inc., Armada, MI (US)

(*) Notice: Subject to any disclaimer, the term of this patent is extended or adjusted under 35 U.S.C. 154(b) by 26 days.

(21) Appl. No.: 12/631,774

(22) Filed: Dec. 4, 2009

(65) Prior Publication Data
US 2011/0088583 A1   Apr. 21, 2011

Related U.S. Application Data

(60) Provisional application No. 61/200,833, filed on Dec. 4, 2008.

(51) Int. Cl.
*C06D 5/00* (2006.01)
(52) U.S. Cl. ........................................................ 102/530
(58) Field of Classification Search .............. 102/530, 102/531, 200, 202.12, 202.14, 202.5, 202.9; 280/741
See application file for complete search history.

(56) References Cited

U.S. PATENT DOCUMENTS

| | | | |
|---|---|---|---|
| 5,131,679 A | 7/1992 | Novak et al. | 280/736 |
| 5,558,366 A | 9/1996 | Fogle, Jr. et al. | 280/736 |
| 5,588,676 A * | 12/1996 | Clark et al. | 280/741 |
| 5,631,439 A | 5/1997 | Sallee et al. | 102/217 |
| 6,044,557 A * | 4/2000 | Smith et al. | 29/897.2 |
| 6,079,740 A * | 6/2000 | Barth et al. | 280/737 |
| 6,718,884 B1 | 4/2004 | Yabuta et al. | 102/530 |
| 6,763,764 B2 | 7/2004 | Avetisian et al. | 102/202.19 |
| 6,820,556 B1 | 11/2004 | Oda | 102/202.7 |
| 6,848,713 B2 | 2/2005 | Nakashima et al. | 280/741 |
| 6,851,373 B2 * | 2/2005 | Quioc | 102/530 |
| 7,401,810 B2 | 7/2008 | Brisighella, Jr. et al. | 280/741 |
| 7,431,337 B2 | 10/2008 | Matsuda et al. | 280/741 |
| 2004/0112244 A1 | 6/2004 | Barker et al. | 102/530 |
| 2004/0251667 A1 | 12/2004 | Harada et al. | 280/736 |
| 2006/0082113 A1* | 4/2006 | Smith et al. | 280/741 |
| 2006/0201369 A1 | 9/2006 | Kuroda et al. | 102/289 |
| 2006/0260498 A1 | 11/2006 | Hatomoto | 102/202.14 |
| 2007/0137512 A1 | 6/2007 | Oda | 102/202.12 |
| 2007/0186797 A1* | 8/2007 | Kurita et al. | 102/530 |
| 2009/0167006 A1 | 7/2009 | Schonhuber et al. | 280/741 |

* cited by examiner

*Primary Examiner* — Bret Hayes
*Assistant Examiner* — Reginald Tillman, Jr.
(74) *Attorney, Agent, or Firm* — L.C. Begin & Associates, PLLC

(57) ABSTRACT

A base assembly for a gas generating system is provided. The base assembly includes a base and a retainer affixed to the base. In an alternative embodiment, the assembly includes an initiator molded to both the base and the retainer.

20 Claims, 3 Drawing Sheets

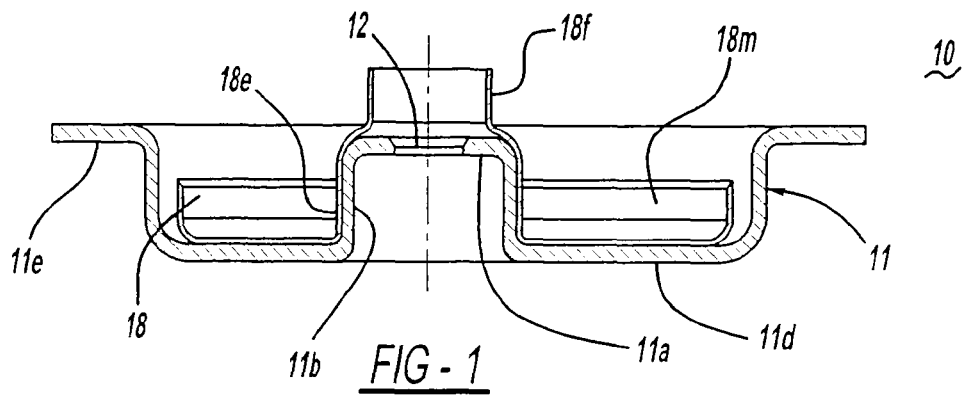
FIG - 1
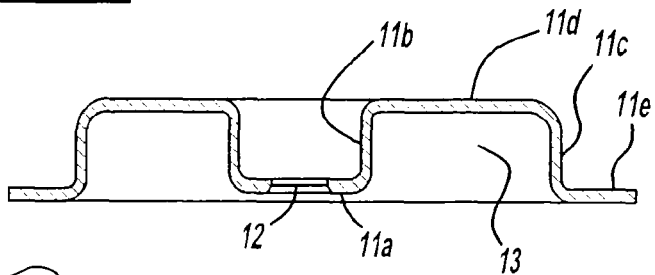
FIG - 2A
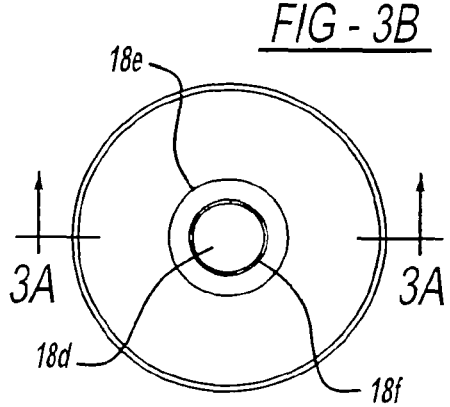
FIG - 3B
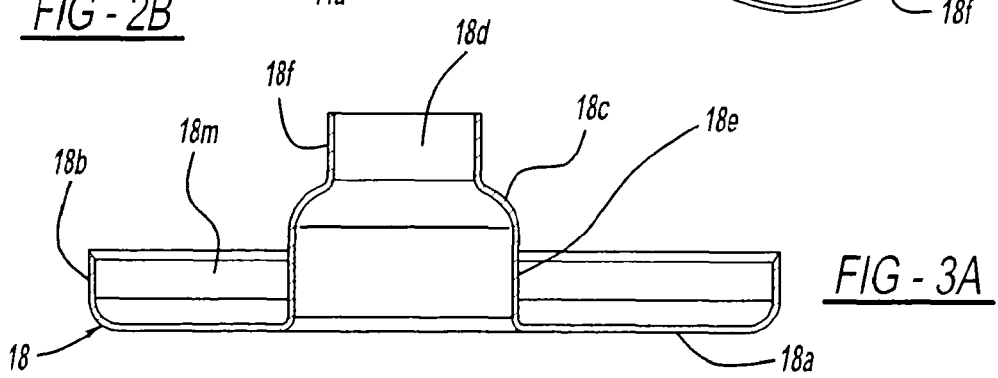
FIG - 2B
FIG - 3A

GAS GENERATING SYSTEM

CROSS REFERENCE TO RELATED APPLICATIONS

This application claims the benefit of provisional application Ser. No. 61/200,833, filed on Dec. 4, 2008.

BACKGROUND OF THE INVENTION

The present invention relates generally to gas generating systems utilizing a pyrotechnic initiator for initiating operation of a gas generating system.

SUMMARY OF THE INVENTION

In one aspect, the present invention provides a base assembly for a gas generating system. The base assembly includes a base and a retainer affixed to the base.

BRIEF DESCRIPTION OF THE DRAWINGS

FIG. 1 is a cross-sectional side view of a base assembly for a gas generating system housing in accordance with a first embodiment of the present invention.

FIG. 2A is a cross-sectional side view of a base incorporated into the embodiment shown in FIG. 1.

FIG. 2B is a plan view of the base shown in FIG. 2A.

FIGS. 3A and 3B are a cross-sectional side view and a plan view, respectively, of a retainer in accordance with an embodiment of the present invention.

DETAILED DESCRIPTION

FIGS. 1-3B show views of one embodiment of a base assembly 10 forming part of a housing 34 gas generating system 200 in accordance with one embodiment of the present invention.

Figure 5:
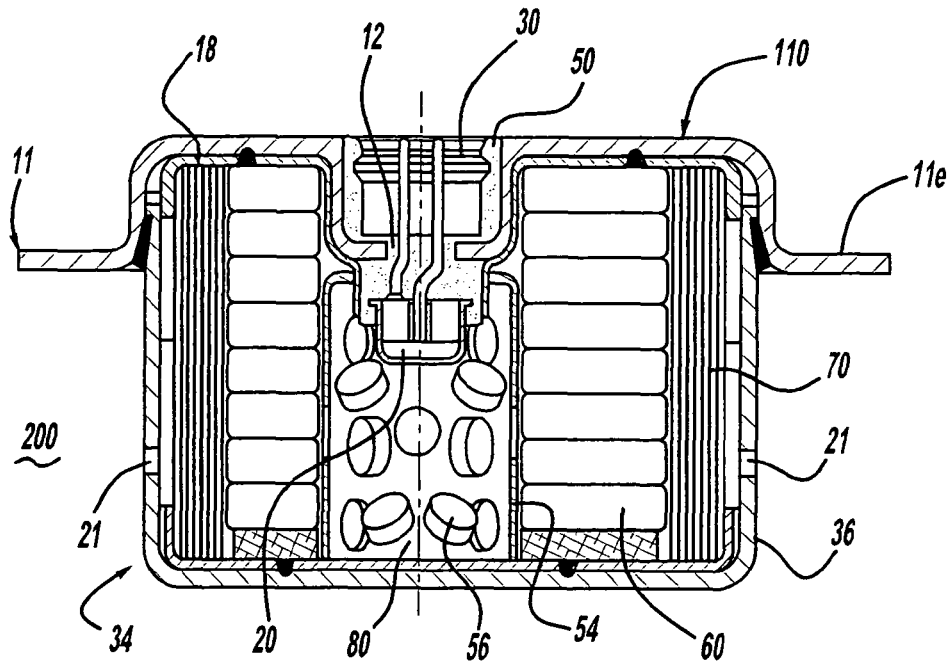
FIG. 5 is cross-sectional side view of a gas generating system incorporating an embodiment of a base assembly in accordance with an embodiment of the present invention.

In the embodiment shown in FIGS. 1-3B, the base assembly 10 includes a base 11 forming part of a gas generating system housing 34 (for example, as seen in FIG. 5) to provide an enclosure containing known gas generating system components, such as an initiator 20, a booster cup 54 containing a booster material 56, a gas generant material 60, a filter 70, an auto-ignition material (not shown), and other components as shown in FIG. 5.

Base 11 includes an inner portion 11a having an orifice 12 formed for receiving therein a known pyrotechnic initiator 20. An inner wall 11b extends from base inner portion 11a and an outer wall 11c extends opposite inner wall 11b. A connecting portion 11d joins walls 11b and 11c. Walls 11b and 11c and connecting portion 11d combine to form an annular cavity 13 for receiving a portion of retainer 18 therein. In the embodiment shown in FIGS. 1-3C, walls 11b and 11c are annular in configuration, although alternative wall configurations are possible depending on the requirements of a particular application. A peripheral flange 11e extends from outer wall 11c to facilitate mounting of the gas generating system to a vehicle or other device. Base 11 may be stamped or otherwise formed from a metal, metal alloy, or other suitable material.

In the embodiment shown in FIGS. 1-3C, base assembly 10 also includes a retainer 18 for positioning and retaining therein a gas generating system filter 70 and gas generant material 60 (described below). In the embodiment shown in FIGS. 1-3, retainer 18 has an annular base portion 18a, an annular outer wall 18b extending from an outer edge of the base portion, and an annular inner wall 18c extending from an inner edge of the base portion. Inner wall 18c, base portion 18a, and outer wall 18b combine to define a cavity 18m for receiving gas generant material 60 and an end portion of filter 70 therein. Inner wall 18c also forms an interior cavity 18d which necks down in a direction proceeding away from base portion 18a to an annular first section 18e having a first inner diameter and an annular second section 18f adjacent the first section 18e and having a second inner diameter smaller than the first diameter. The inner diameter of the first section 18e is dimensioned to contact base inner wall 11b in a snug or sliding fit when the base inner portion 11a and inner wall 11b are inserted into cavity 18d. Retainer 11 may be stamped, drawn, or otherwise formed from a metal, metal alloy, or other suitable material.

To attach the retainer 18 to base 11, base inner portion 11a and inner wall 11b are inserted into cavity 18d and base connecting portion 11d and retainer base portion 18a are brought into contact or close proximity with each other. The base and retainer are then welded together along the base connecting portion 11d and the retainer base portion 18a. Other methods of affixing the retainer to the base are also contemplated.

Referring again to FIGS. 4A-5, gas generating system 10 also includes an initiator or igniter 20 positioned so as to enable fluid communication between the initiator and a booster composition or other ignitable material upon activation of the gas generating system, for initiating combustion of gas generant composition 30. In the embodiment shown in FIG. 5, an end of initiator 20 extends from solidified mold material 50 into a booster chamber formed by a booster cup 54 incorporated into the gas generating system.

In a particular 110 embodiment of the base assembly, the initiator is incorporated into the base assembly and is molded to both base 11 and retainer 18. Molding of the initiator directly to the base also forms a gas-tight seal between the base and the initiator. One example of an initiator suitable for use in the gas generating system of the present invention is described in U.S. Pat. No. 6,009,809, incorporated herein by reference.

"Molding" of the initiator into the base assembly as described herein is understood to mean that a flowable molding material, adhesive material, or other material having a viscosity suitable for injecting, pouring, or otherwise inserting into the housing is introduced into the housing interior to occupy a space between the initiator and the housing and between the initiator and the retainer, after the initiator has been positioned and secured for purposes of the molding operation. Thus, the base and retainer form a portion of the mold. The flowable material in contact with the base, the retainer, and the initiator then hardens or solidifies to encase a portion of the initiator and to secure the initiator to the base and retainer. The solidified molding material may also form a gas-tight seal between the base and the initiator.

Figure 4A:
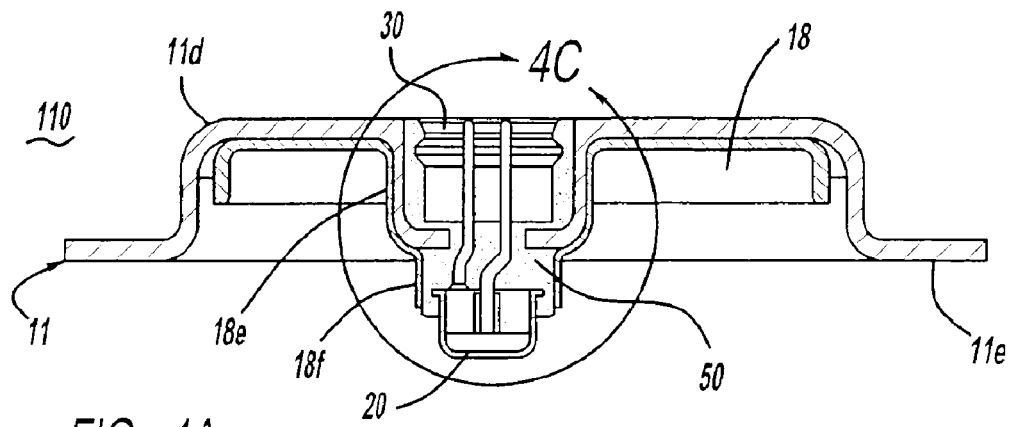
FIG. 4A is a cross-sectional side view of a base assembly in accordance with a second embodiment of the present invention.
Figure 4B:
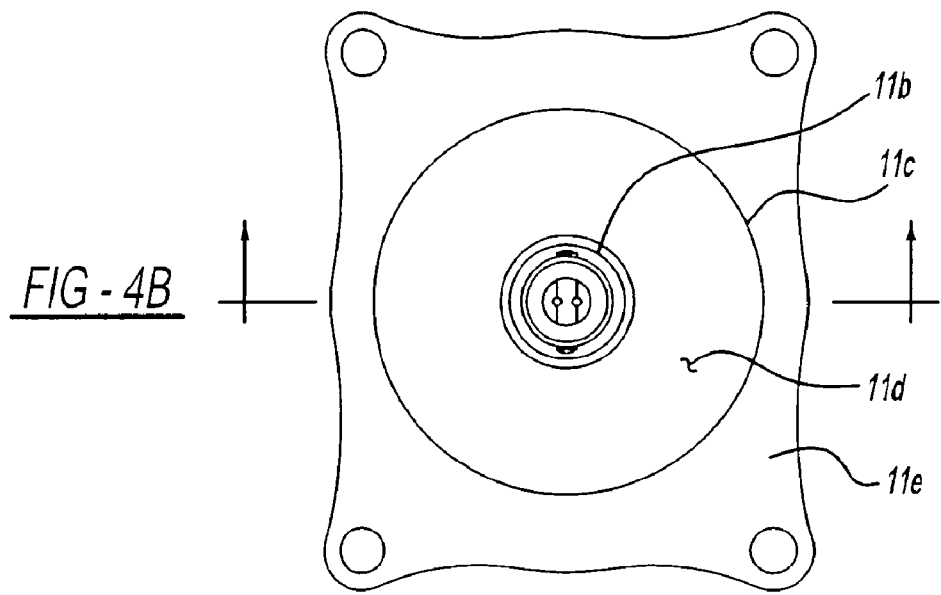
FIG. 4B is a plan view of the base assembly shown in FIG. 4A.
Figure 4C:
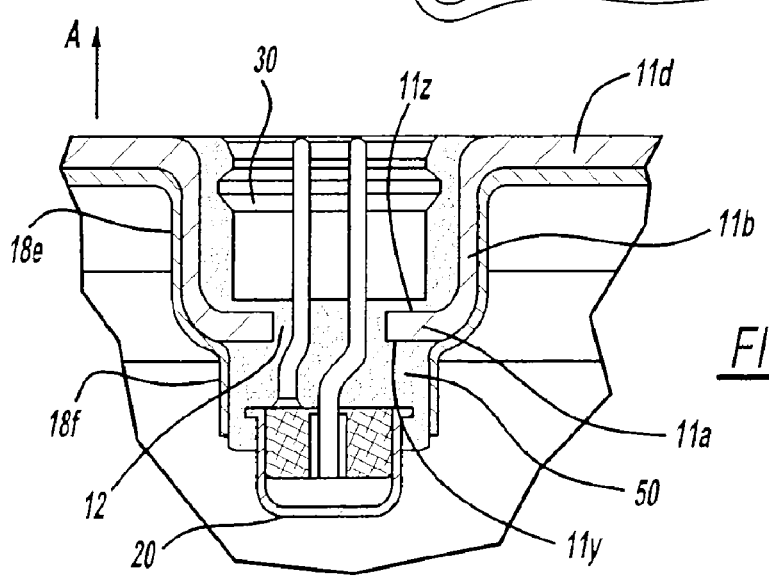
FIG. 4C is a magnified view of a portion of the base assembly shown in FIG. 4A.

As seen in FIGS. 4A and 4C, when base inner portion 11a and inner wall 11b are inserted into cavity 18d, base inner portion 11a containing orifice 12 extends into retainer cavity 18d. Also, when initiator 20 is molded into base assembly 10, a portion of the initiator extends through orifice 12 from a first side 11z of the base to a second side 11y of the base opposite the first side. Orifice 12 is sized to be too small to permit a body portion 20a of initiator 20 to pass through the orifice from one side of base inner portion 11a to an opposite side of the base inner portion in a first direction indicated by arrow "A" (FIG. 4C). This aids in preventing removal or ejection of initiator 20 through orifice 12.

Also, as seen in FIG. 4C, when the initiator 20 is molded to the base 11 and retainer 18, base inner portion 11a projects into the mold material 50. Thus, mold material molding the initiator to the base extends along first side 11z of the base and also along a second side 11y of the base. Projection of base inner portion 11a into the mold material 50 as shown aids in positioning and securing the solidified mold material and the initiator 20 encased therein to the other elements of the base assembly 10.

FIGS. 1-5 show an embodiment of the base assembly 11 configured for receiving and securing a single initiator 20 thereto, as described below. Although described herein in terms of a single initiator molded to the base and retainer, the features and principles applicable to the embodiment shown in FIG. 1 will also be applicable to embodiments incorporating multiple initiators molded into the base assembly.

In the embodiments disclosed herein, molding materials for securing the initiator(s) to the base assembly may be selected based on such factors as desired fabrication methods, system operational requirements, and other pertinent factors. Materials such as polymers, pourable and injectible adhesives and potting compounds, and/or any other suitable materials may be used. Molding parameters such as pressure and temperature may be iteratively determined based on such factors as the molding materials and methods selected, the structure of the mold into which the molding material is to be inserted, and other pertinent factors.

Referring to FIGS. 4A and 4C, in another particular embodiment, a connector housing structure 30 for receiving and engaging an associated electrical connector (not shown) is molded into the structure encasing the initiator 20 and joining the initiator to the base 11 and retainer 18. Connector housing structure 30 is used for connecting initiator 20 to a vehicle electrical apparatus, in a manner known in the art. A known electrical shorting clip structure (not shown) may also be molded into the molding material if desired.

FIG. 5 shows an embodiment 110 of the base assembly incorporated into a gas generating system 200. Referring to FIG. 5, gas generating system 200 includes a generally cylindrical housing 34 having base assembly 110 and a cap 36 affixed to the base assembly to form the system housing. Cap 36 has a plurality of openings 21 formed therealong to permit fluid communication between an interior of the housing and an associated airbag (not shown). Openings 21 may be covered with a foil (not shown) such as aluminum or stainless steel foil to prevent the incursion of water vapor into housing 34. The foil, sometimes referred to as "burst foil" is typically of a thickness of from 0.01 to about 0.20 mm. The foil is typically adhered to an interior surface of the housing through the use of an adhesive.

A booster cup 54 encloses the exposed portion of initiator 20 and defines a booster chamber 80 containing a known booster material 56 positioned within housing 34 so as to enable fluid communication between the booster material and gas generant material 60 upon activation of the inflator. Activation of initiator 20 produces combustion of the booster material, thereby effecting ignition of gas generant material 60 in a manner known in the art.

Gas generant material 60 is positioned exterior of booster cup 54 and within retainer cavity 18m. Gas generant 60 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable compositions are set forth in the U.S. patent application Ser. Nos. 10/407,300 and 60/369,775, incorporated by reference herein.

Referring again to FIG. 5, a known filter 70 occupies a plenum formed between the gas generant material 60 and an outer wall of housing 34.

Figure 6:
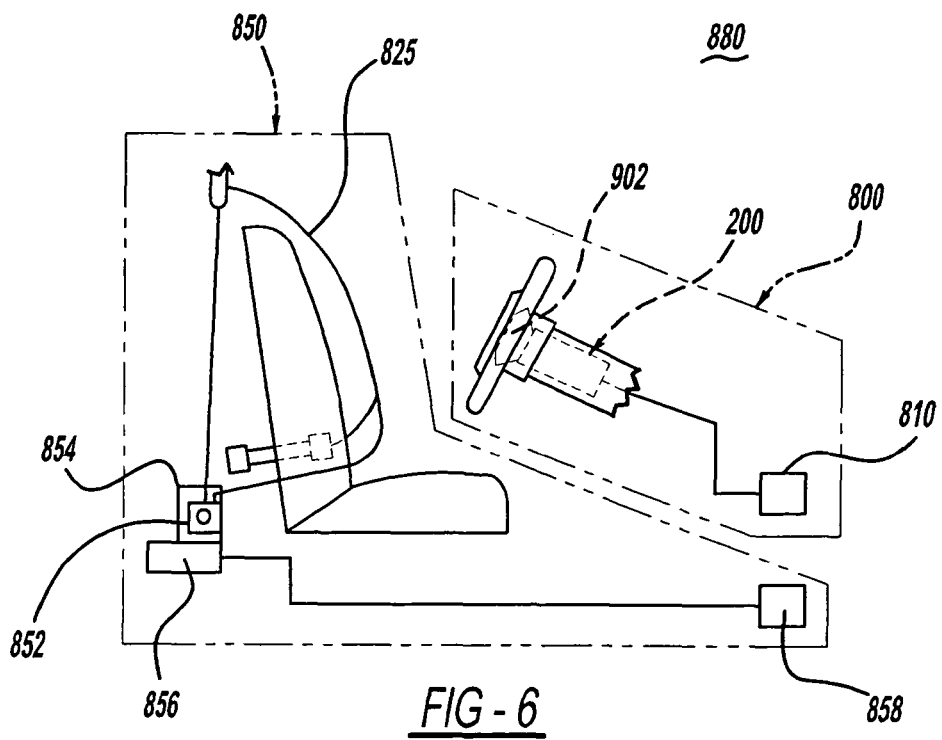
FIG. 6 is a schematic representation of an exemplary vehicle occupant protection system incorporating a gas generating system having a base assembly in accordance with an embodiment of the present invention.

Referring now to FIG. 6, in one possible application of an embodiment of the base assembly described herein, gas generating system 200 or another gas generating system including another embodiment of the base assembly is incorporated into an airbag system 800. Airbag system 800 includes at least one airbag 902 and a gas generating system including an embodiment of the base assembly coupled to the airbag so as to enable fluid communication with an interior of the airbag upon activation of the gas generating system. System 800 may be in communication with a crash event sensor 810 that includes (or is in operative communication with) a crash sensor algorithm (not shown) which signals activation of airbag system 800 via, for example, activation of initator 20 (not shown in FIG. 7) in the event of a collision.

Operation of the inflator will now be discussed with reference to FIG. 5.

Upon a crash event, a signal from a crash sensor (not shown) is conveyed to initiator 20, thereby activating booster propellant 56. Heat from combustion of booster propellant 56 produces ignition of gas generant 60. Inflation gas produced by combustion of gas generant 60 proceeds radially out through filter 70, exiting housing 34 through openings 21.

Referring again to FIG. 6, a gas generating system including an embodiment of the base assembly, or an airbag system including such a gas generating system may be also incorporated into a broader, more comprehensive vehicle occupant protection system 880 including additional elements such as a safety belt assembly 850. Safety belt assembly 850 includes a safety belt housing 852 and a safety belt 825 extending from housing 852. A safety belt retractor mechanism 854 (for example, a spring-loaded mechanism) may be coupled to an end portion of the belt. In addition, a safety belt pretensioner 856 may be coupled to belt retractor mechanism 854 to actuate the retractor mechanism in the event of a collision. Typical seat belt retractor mechanisms which may be used in conjunction with safety belt 825 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 825 may be combined are described in U.S. Pat. Nos. 6,505,790 and 6,419,177, incorporated herein by reference.

Safety belt assembly 850 may be in communication with a crash event sensor 858 (for example, an inertia sensor or an accelerometer) that includes (or is in operative communication with) a crash sensor algorithm (not shown) which signals actuation of belt pretensioner 856 via, for example, activation of initiator 24 (not shown in FIG. 7) or another initiator (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the various components may be molded, stamped or otherwise formed from carbon steel, aluminum, metallic alloys, or any of a variety of polymers.

It will be understood that the foregoing descriptions of embodiments of the present invention are for illustrative purposes only. As such, the various structural and operational features disclosed herein are susceptible to a number of modifications commensurate with the abilities of one of ordinary skill in the art, none of which departs from the scope of the present invention as defined in the appended claims.

What is claimed is:

1. A base assembly for a gas generating system, comprising:
    a base;
    a retainer affixed to the base;
    an initiator extending into an opening in the retainer;
    a quantity of moldable material positioned between, and in contact with, the initiator and the base so as to form a gas-tight seal therebetween; and
    a quantity of moldable material securing the initiator to the retainer so as to prevent relative motion between the retainer and the initiator, the moldable material being positioned between and in contact with the initiator and the retainer so as to form a gas-tight seal therebetween.

2. The base assembly of claim 1 further comprising an initiator molded to the base and to the retainer.

3. The base assembly of claim 1 wherein the initiator is spaced apart from the base and the retainer.

4. The base assembly of claim 3 wherein the opening in the base is sized to prevent movement of the portion of the initiator on the second side of the base to the first side of the base.

5. The base assembly of claim 1 wherein the base includes an orifice, the orifice extending between a first side of the base and a second side of the base opposite the first side, and wherein the moldable material extends through the orifice and is in contact with the base along the first side and the second side.

6. A gas generating system comprising a base assembly in accordance with claim 1.

7. A vehicle occupant protection system comprising a base assembly in accordance with claim 1.

8. The base assembly of claim 1 wherein the base has a first wall, a second wall extending opposite the first wall, and a connecting portion connecting the first and second walls, and wherein both the first and second walls extend in a first direction away from the connecting portion.

9. The base assembly of claim 1 wherein the retainer includes a base portion, an inner wall extending from an inner edge of the base portion, and an outer wall extending from an outer edge of the base portion and spaced apart from the inner wall, the inner wall defining a cavity structured to receive an initiator therein, and the inner wall, base portion, and outer wall combining to define the cavity structured to receive the filter therein.

10. The base assembly of claim 5 wherein the moldable material is in contact with the base along the inside of the orifice.

11. A base assembly for a gas generating system comprising:
    a base including an orifice extending between a first side of the base and a second side of the base opposite the first side;
    a retainer affixed to the base;
    an initiator extending through the orifice; and
    a quantity of moldable material securing the initiator to the retainer,
    wherein the moldable material extends through the orifice and is in contact with the base along the first side and the second side.

12. A vehicle occupant protection system comprising a base assembly in accordance with claim 11.

13. A gas generating system comprising a base assembly in accordance with claim 11.

14. The base assembly of claim 11 wherein the initiator is spaced apart from the base and the retainer.

15. A method for fabricating a base assembly for a gas generating system, comprising the steps of:
    providing a base having an orifice formed therein;
    providing an initiator;
    providing a retainer defining a cavity;
    positioning the retainer with respect to the base such that the base orifice is positioned within the retainer cavity;
    after the step of positioning the retainer with respect to the base, positioning the initiator such that at least a portion of the initiator resides within the cavity;
    after the step of positioning the initiator, introducing a flowable, hardenable material into the cavity such that the initiator is secured to the base and to the retainer by the material upon hardening of the material.

16. The method of claim 15 wherein the step of introducing the material comprises the step of introducing the material between the initiator and the base and between the initiator and the retainer.

17. A gas generating system comprising a base assembly fabricated using a method in accordance with claim 15.

18. A vehicle occupant protection system comprising a base assembly fabricated using a method in accordance with claim 15.

19. The method of claim 15 wherein the step of introducing the material comprises the step of introducing the material so as to be in contact with the initiator, the base, and the retainer.

20. The method of claim 15 further comprising, after the step of positioning the retainer with respect to the base and prior to the step of positioning the initiator, securing the retainer in position with respect to the base.

* * * * *